United States Patent
Blocquel et al.

(10) Patent No.: US 7,896,220 B2
(45) Date of Patent: *Mar. 1, 2011

(54) PROCESS FOR THE REPAIR OF AT LEAST ONE CONNECTING AREA BETWEEN A PARTITION PLATE AND A TUBE PLATE OF A WATER CHAMBER OF A HEAT EXCHANGER

(75) Inventors: Alain Blocquel, Dardilly (FR); Jean-Claude Ferlay, Chatenoy le Royal (FR); Olivier Theallier, Saint Pierre de Varennes (FR)

(73) Assignees: Areva NP, Courbevoie (FR); Electricite de France-French Corporation, Paris (FR)

( * ) Notice: Subject to any disclaimer, the term of this patent is extended or adjusted under 35 U.S.C. 154(b) by 1013 days.

This patent is subject to a terminal disclaimer.

(21) Appl. No.: 11/617,110

(22) Filed: Dec. 28, 2006

(65) Prior Publication Data

US 2007/0209195 A1    Sep. 13, 2007

(30) Foreign Application Priority Data

Dec. 29, 2005    (FR)    .................................. 05 13472

(51) Int. Cl.
*B23K 31/02*    (2006.01)
(52) U.S. Cl. ...................................... 228/119; 228/183
(58) Field of Classification Search ........................ None
See application file for complete search history.

(56) References Cited

U.S. PATENT DOCUMENTS

| | | | | |
|---|---|---|---|---|
| 3,930,487 A | * | 1/1976 | Gugel | .......................... 226/91 |
| 4,131,018 A | * | 12/1978 | Muller et al. | ............... 73/866.5 |
| 4,200,424 A | * | 4/1980 | Gerkey et al. | ............ 414/744.6 |
| 4,205,939 A | * | 6/1980 | Reyes | .......................... 414/728 |
| 4,216,893 A | * | 8/1980 | Glatthorn | ...................... 228/45 |
| 4,231,419 A | * | 11/1980 | Gugel | ........................ 165/11.2 |

(Continued)

FOREIGN PATENT DOCUMENTS

EP    0 045 454    2/1982

(Continued)

OTHER PUBLICATIONS

G. Schucktanz, "Optimization of Steam Generator Performance," vol. 51, No. 4, Dec. 1987, Munchen, Germany, pp. 223-227.

*Primary Examiner*—Kiley Stoner
(74) *Attorney, Agent, or Firm*—Connolly Bove Lodge & Hutz LLP (57) ABSTRACT

The invention relates to a process for repairing at least one connecting area between a partition plate (8) and a tube plate (5) of a water chamber (7) of a heat exchanger (1), in which process the area of weld requiring repair is identified, at least one rail (11) is inserted into the water chamber, the said rail (11) is attached below the tube plate (5), a robot arm (20) is inserted, the robot arm is hoisted within the water chamber, the robot arm is remotely controlled, the connecting area requiring repair is machined and a check is made to ensure that cracks have been eliminated from the repaired area.

4 Claims, 6 Drawing Sheets

U.S. PATENT DOCUMENTS

| | | | |
|---|---|---|---|
| 4,247,974 A * | 2/1981 | Golick | 29/407.05 |
| 4,261,094 A * | 4/1981 | Gerkey et al. | 29/727 |
| 4,347,652 A * | 9/1982 | Cooper et al. | 29/407.09 |
| 4,438,805 A * | 3/1984 | Gugel | 165/11.2 |
| 4,523,470 A * | 6/1985 | Muller et al. | 73/623 |
| 4,658,186 A * | 4/1987 | Horinouchi | 315/169.3 |
| 4,790,065 A | 12/1988 | Cooper, Jr. et al. | |
| 4,854,312 A * | 8/1989 | Raftopoulos et al. | 606/68 |
| 4,918,808 A * | 4/1990 | Cartry et al. | 29/727 |
| 4,937,933 A * | 7/1990 | Dietrich | 29/726 |
| 4,959,192 A * | 9/1990 | Trundle et al. | 376/260 |
| 5,008,996 A * | 4/1991 | Bonnand et al. | 29/727 |
| 5,061,433 A * | 10/1991 | Gente et al. | 376/260 |
| 5,167,907 A * | 12/1992 | Mauget et al. | 376/260 |
| 5,201,118 A * | 4/1993 | McParland | 29/890.031 |
| 5,385,122 A * | 1/1995 | Stalport et al. | 122/511 |
| 5,430,270 A * | 7/1995 | Findlan et al. | 219/121.63 |
| 5,432,828 A * | 7/1995 | Cayment et al. | 376/260 |
| 6,308,774 B1 * | 10/2001 | Kramer et al. | 165/95 |
| 7,430,266 B2 * | 9/2008 | Latreille et al. | 376/260 |
| 2007/0153957 A1* | 7/2007 | Gely et al. | 376/249 |
| 2008/0163472 A1* | 7/2008 | Cullafroz et al. | 29/402.18 |

FOREIGN PATENT DOCUMENTS

| | | | |
|---|---|---|---|
| FR | 2 811 064 | | 1/2002 |
| GB | 2365103 A | * | 2/2002 |

* cited by examiner

PROCESS FOR THE REPAIR OF AT LEAST ONE CONNECTING AREA BETWEEN A PARTITION PLATE AND A TUBE PLATE OF A WATER CHAMBER OF A HEAT EXCHANGER

TECHNICAL FIELD

This invention relates to a process for the repair of at least one connecting area between a partition plate and a tube plate of a water chamber of a heat exchanger and, in particular, a steam generator in a pressurised water nuclear reactor.

BACKGROUND TO THE INVENTION

Pressurised water nuclear reactors include a primary circuit in which pressurised water cooling the nuclear reactor circulates, this generally comprising several loops in each of which there is a steam generator which heats and vaporises the feed water through the exchange of heat between the pressurised nuclear reactor cooling water and the feed water to generate steam which is delivered to the nuclear power station's turbine. Steam generators for pressurised water nuclear reactors comprise an envelope of generally cylindrical shape with its axis vertical, within which is located a heat exchanger tube bundle and a substantially hemispherical water chamber comprising the lower part of the steam generator, below the envelope enclosing the bundle.

A thick tube plate located horizontally and perforated by systematically arranged holes in a vertical direction provides separation between the upper part of the steam generator and the water chamber. The tubes in the steam generator bundle are engaged and fixed into the holes in the tube plate by means of their extremities in a leaktight manner. The water chamber is bounded by both the hemispherical wall constituting the lower part of the steam generator envelope and the horizontal undersurface of the tube plate into which the holes for the passage and attachment of the tubes of the bundle open.

Each of the tubes in the bundle is arched at the top and has two straight branches whose extremities engage in the holes passing through the tube plate on either side of a partition plate separating the water chamber into two compartments each connected via a pipe to a primary circuit duct in such a way that the reactor cooling water enters the water chamber in one of the compartments in order to be distributed to each of the tubes in the bundle.

The pressurised cooling water circulating within the tubes of the bundle is collected in the second compartment of the water chamber so that it can be collected by a duct in the primary circuit connected to the second compartment of this water chamber.

In order that access may be gained to the water chamber the hemispherical envelope of this water chamber is traversed by an inspection opening or manhole in each of the two parts of the hemispherical envelope bounding one compartment of the water chamber.

On its underside the tube plate comprises a band forming an additional thickness, also known as a partition stub, with which the upper edge of the partition plate is aligned.

The partition plate is attached to the tube plate by a weld at each of its longitudinal edges.

While the nuclear reactor is in operation, the tube plate and the partition plate are subjected to mechanical and thermal stresses. These stresses also have an effect in the connecting areas between the tube plate and the partition plate, that is to say in the weld itself and above all in the areas adjacent to that weld.

After operation for some time these stresses can give rise to the appearance of cracks or incipient cracks in the connecting areas which need to be detected to prevent any leakage of pressurised cooling water into the inner space of the steam generator envelope to which feed water is fed so that they will not prejudice the integrity of the pressurised envelope should cracks propagate.

In the situation where cracks or incipient cracks are detected in these areas, a repair has to be made in order to avoid the risk of leaks or compromising the integrity of the pressurised envelope when the steam generator is brought back into operation.

These repairs are generally performed during scheduled shutdowns of the nuclear power station for recharging the reactor vessel with fuel assemblies.

These repairs may be carried out by operators working within the water chamber of the steam generator.

This technique has the disadvantage that operators have to work in a highly radioactive area containing deposits of activated materials which are carried into the water chamber by the nuclear reactor cooling water circulating in contact with the core's fuel assemblies. This being the case the doses received by operators may be large, even when work is carried out very quickly with each of the operators only being present in the water chamber of the steam generator for a very short time.

Many operators therefore have to carry out the work, so that the doses which they receive are limited.

In order to avoid the disadvantages associated with the need for operators to enter into the water chamber it is known that devices remotely controlled from outside the water chamber can be used to carry out inspection operations and to carry out various tasks, for example eliminating cracks or incipient cracks, or for any other work.

These remote controlled devices can reduce the time during which operators are present within the steam generator water chamber, or even do away with the need for operators to work within the water chamber.

For this purpose an anthropomorphic robot arm which is caused to enter the water chamber through the inspection opening and which includes an attachment portion attached to the wall of the water chamber in the vicinity of that opening is known.

Devices for working within a water chamber of a steam generator which incorporate a plate attaching the device to the undersurface of the tube plate and a turret which can be mounted on the attachment plate so that it can rotate about an axis perpendicular to the plate, that is to say a vertical axis perpendicular to the tube plate while the work is being carried out, are also known.

The device also comprises one or two telescopic arms which rotate as one piece with the turret in such a way that they can be caused to move in rotation about the axis of the turret in order to sweep through one or two annular fields.

The devices used hitherto are in general fairly bulky and extremely complex in their structure and require long and difficult operations, in particular for inserting and positioning them within the steam generator's water chamber.

Furthermore, these devices are generally provided for specific operations and are not intended to withstand large forces, particularly in the course of machining operations.

Also, fitting the device within the water chamber in an initial stage of the operation is a complex task which may require at least one operator to be present within the water chamber.

SUMMARY OF THE INVENTION

The invention therefore has the object of providing a process for the repair of at least one connecting area between a partition plate and a tube plate in a heat exchanger water chamber which avoids the disadvantages mentioned above.

The invention therefore relates to a process for the repair of at least one connecting area between a partition plate and a tube plate of a heat exchanger water chamber, the said water chamber comprising a wall of substantially hemispherical shape provided with at least one inspection opening and bounded at the top by the tube plate through which a plurality of vertical holes pass, and transversely by the partition plate, wherein, the connecting area requiring repair is identified,
at least one rail supporting at least one carriage which can move along the said rail and which is equipped with pendular lifting means is inserted into the water chamber through the inspection opening,
the said rail is secured below the tube plate,
a robot arm is passed in through the opening,
the robot arm is hoisted within the water chamber by the lifting means and the said robot arm is secured below the tube plate,
the robot arm is remotely controlled,
a reference associated with the position of the arm in the water chamber is obtained and the connecting area requiring repair is machined to a predetermined depth using a tool in order to eliminate cracks or incipient cracks in the said area, and
elimination of these cracks or incipient cracks is checked.

According to other features of the invention:
after elimination of cracks or incipient cracks has been monitored, the machined area is if appropriate refilled by a welding torch carried by the robot arm,
after the check that cracks or incipient cracks have been eliminated, or after the machined area has been filled by welding, hammering of the repaired area is carried out by means of a tool carried by the robot arm in order to place that area under compression.

BRIEF DESCRIPTION OF THE DRAWINGS

The invention will be better understood on reading the following description which is given by way of example and with reference to the appended drawings in which.

DESCRIPTION OF PREFERRED EMBODIMENTS

Figure 1:
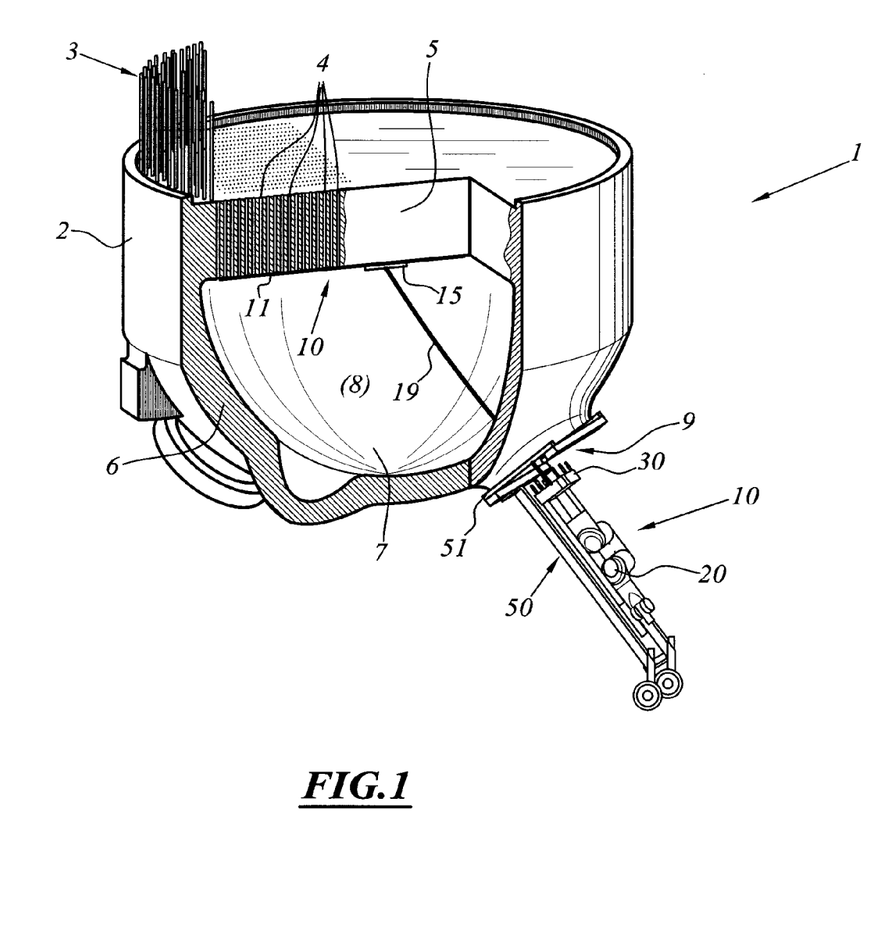
FIG. 1 is a diagrammatical partly detached perspective view of the lower part of a steam generator comprising a water chamber in which repair of a connecting area is carried out by the process according to the invention.

FIG. 1 shows the lower part of a heat exchanger, such as for example a steam generator in a nuclear power station, referred to in general by reference 1. This steam generator comprises an external envelope 2 of general cylindrical shape in which there is a heat exchange bundle comprising a set of tubes 3.

Each of tubes 3 in the steam generator exchanger bundle is conventionally U-shaped and incorporates an arched top part and two straight branches whose lower extremities are engaged in and secured to vertical holes in a tube plate 5 separating the top part of the steam generator enclosing tube bundle 3 from a lower part bounded by a substantially hemispherical wall 6 comprising water chamber 7 of the steam generator. This water chamber 7 is bounded at the top by the undersurface of tube plate 5.

Figure 2:
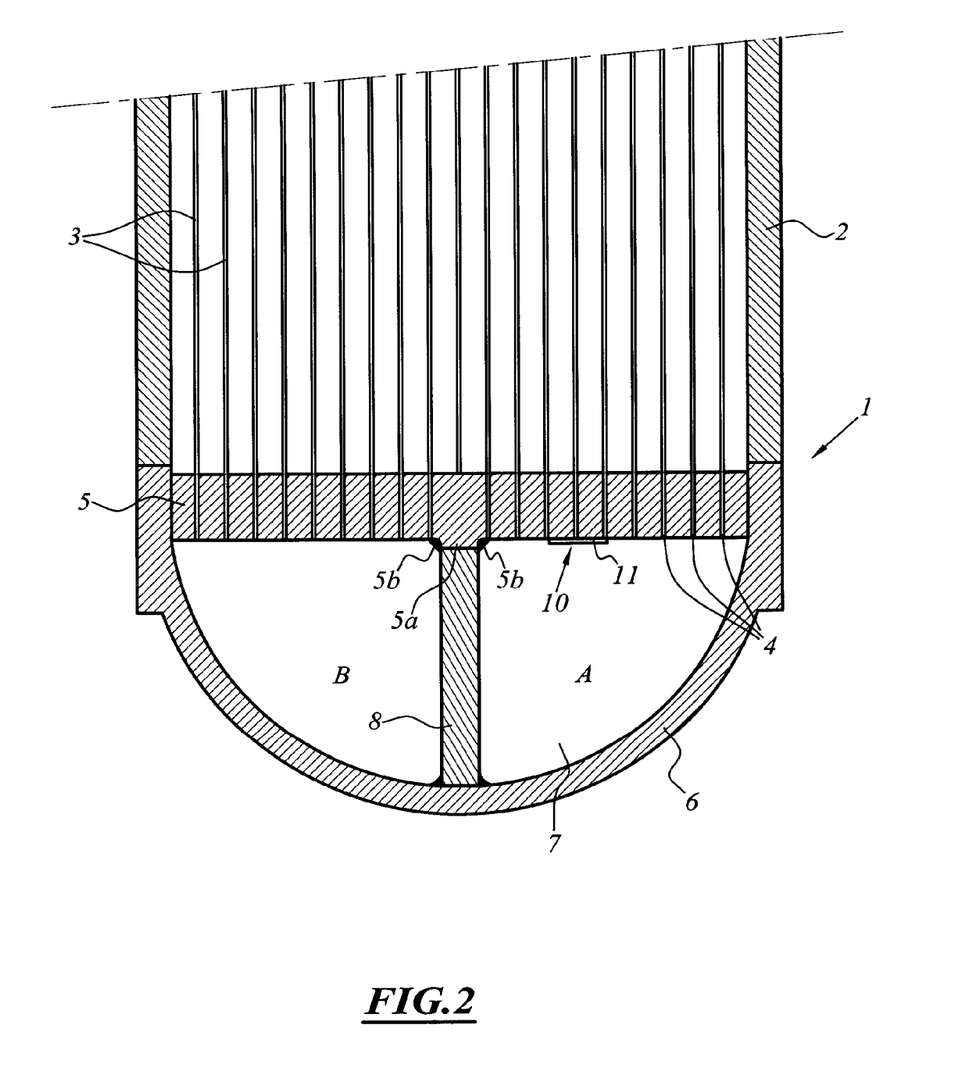
FIG. 2 is a diagrammatical view of the water chamber in cross-section illustrating the position of the partition plate.

As illustrated more particularly in FIG. 2, water chamber 7 is separated into two compartments A and B by a vertical partition forming a partition plate 8. This partition plate is located in a diametral plane of tube plate 5 constituting a plane of symmetry, on either side of which the extremities of the straight branches of each of tubes 3 in the bundle of steam generator 1 are secured.

Partition plate 8 therefore separates water chamber 7 into a first and a second compartment, respectively A and B, respectively connected to an inlet pipe and an outlet pipe, not shown, for water cooling the pressurised water nuclear reactor which circulates within tubes 3 between the inlet compartment and the outlet compartment separated by partition plate 8.

As illustrated in FIG. 2, tube plate 5 comprises, substantially in the middle thereof, a band 5a forming an excess thickness, also known as a partition stub and generally welded to the tube plate through a full penetration weld, and with which the upper edge of partition plate 8 is aligned.

Partition plate 8 is attached to tube plate 5 at each of its longitudinal edges by a weld 5b extending over the full length of partition plate 8.

Each weld 5b and the areas adjacent to this weld form attachment areas in which cracks or incipient cracks may occur after the steam generator has been in operation for a length of time.

An inspection opening or manhole 9 providing access to the interior of this water chamber passes through wall 6 of water chamber 7.

Inspection opening 9 (FIGS. 1 and 4) can in particular be used to insert a repair device, indicated by the general reference 10 and used to eliminate cracks or incipient cracks in each connecting area between tube plate 5 and partition plate 8, into water chamber 7 of the steam generator.

Repair device 10 comprises several independent elements through which working members can be caused to enter within water chamber 7, as well as moved within the said working chamber 7.

As illustrated in FIGS. 1 to 4, the repair device comprises at least one rail 11 fitted with attachment members 18 below tube plate 5.

Figure 3:
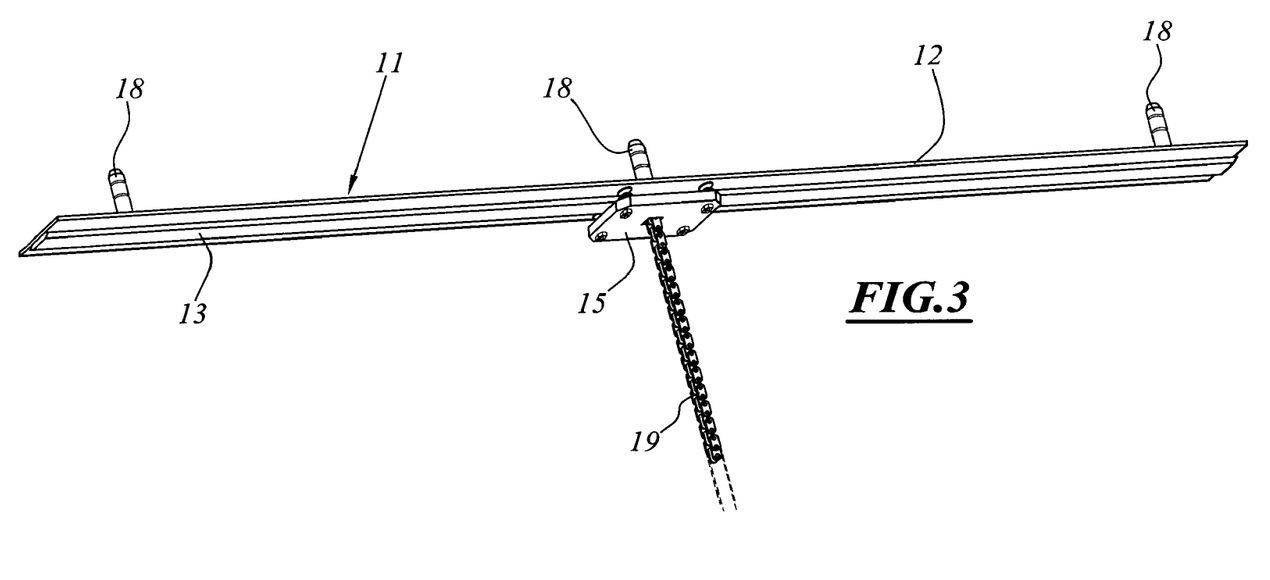
FIG. 3 is a diagrammatical perspective view of a rail and a carriage supporting and moving a robot arm.

As illustrated in FIG. 3, rail 11 comprises a flange 12 which is designed to be applied to the underside of tube plate 5 and a rolling track 13 supported by flange 12 on which at least one carriage 15 moves. Rolling track 13 extends over the entire length of flange 12 of rail 11.

Preferably, rail 11 is formed of two portions of rail to assist insertion into water chamber 7 through inspection opening 9 and each rail 11 comprises members for attachment below tube plate 5.

These attachment members preferably comprise three flange clamps 18 distributed over the entire length of flange 12 of rail 11, as illustrated in FIG. 3. Flange clamps 18 are of the conventional type and each comprise two radially expandable pins and each have a nominal outside diameter which is very much smaller than the inside diameter of vertical holes 4.

The pins of clamps 18 can be caused to expand from outside water chamber 7 through an appropriate known drive device.

As illustrated in FIG. 3, carriage 15 is equipped by pendular lifting means 19 comprising a chain or cable or any other appropriate member of a known type.

Figure 6:
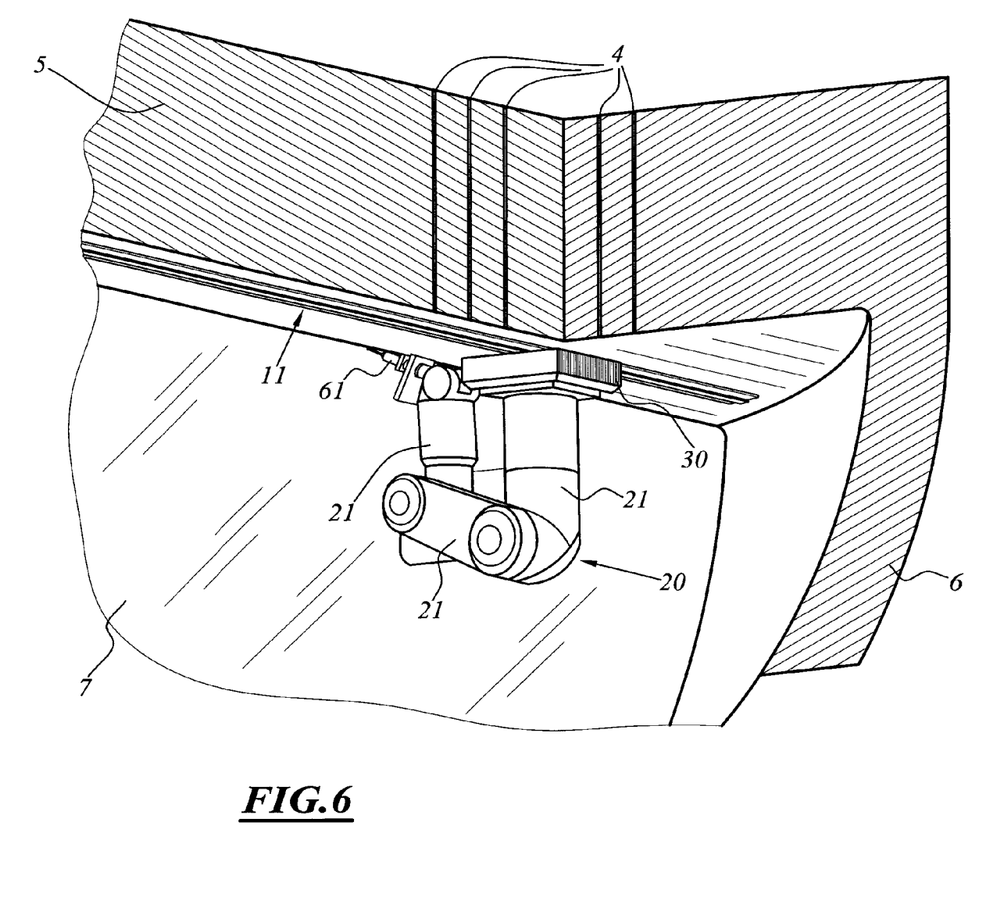
FIG. 6 is a partial diagrammatical perspective view of the water chamber of the steam generator equipped with the robot arm.

Repair device 10 also comprises a robot arm, indicated as a whole by general reference 20. This robot arm 20 of a known type comprises several arm members 21 articulated to the others in order to allow the free extremity 22 to move over 360° in space. Free extremity 22 of robot arm 20 is provided with means for the attachment of an appropriate repair tool for the work which has to be done.

Figure 5:
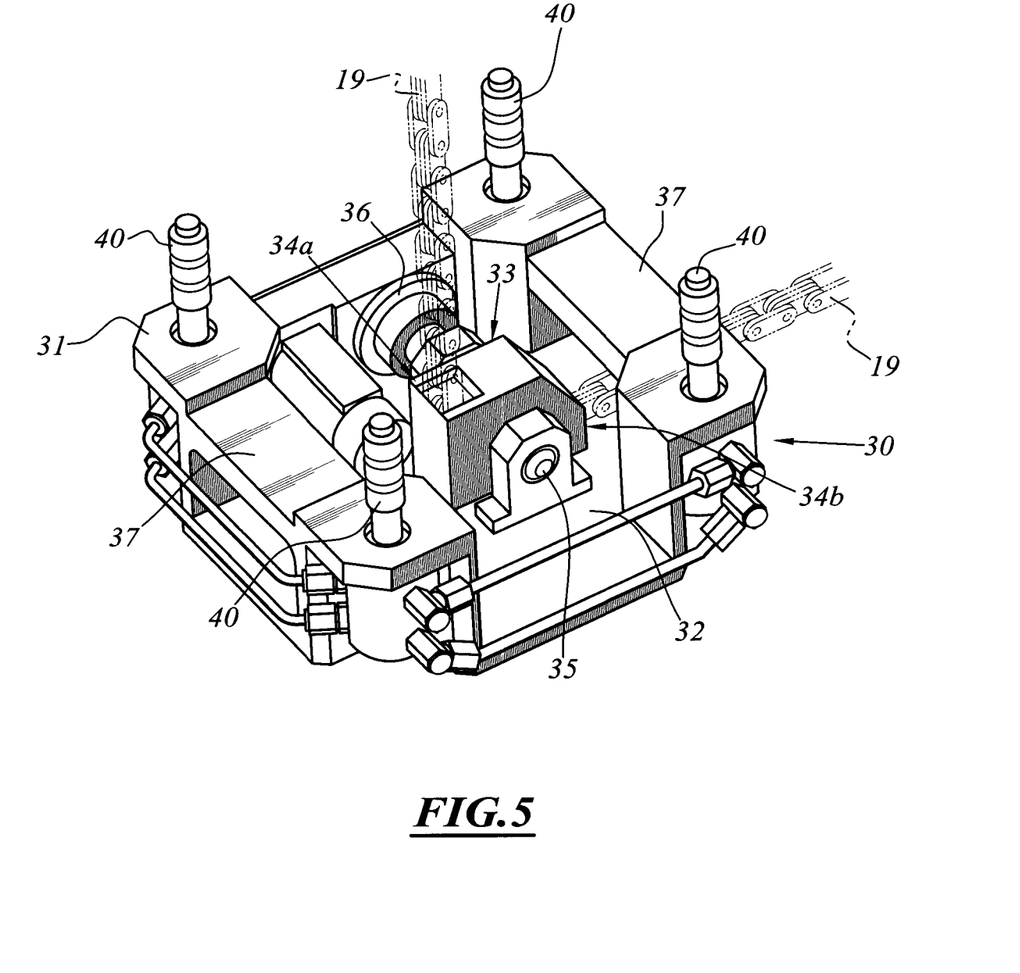
FIG. 5 is a diagrammatical perspective view of a base for attachment of the robot arm to the tube plate.

Robot arm 20 comprises a base 30 for attachment below tube plate 5 and, as illustrated in FIG. 5, this attachment base 30 comprises a bearing plate 31 of generally rectangular shape. Bearing plate 31 of base 30 providing attachment beneath tube plate 5 comprises a central housing 32 within which drive means 33 acting together with lifting means 19 are located in such a way as to abut base 30 against the said tube plate. Drive means 33 comprises a wheel, not shown, placed in a box 34 and this wheel is supported by a shaft 35 driven in rotation by a motor/gearbox 36. This wheel is fitted with means gripping lifting means 19, and in the situation where this lifting means 19 comprises a chain, the wheel is a toothed wheel. In order to permit passage of chain 19, box 34 incorporates an opening 34a for the entry of chain 19 and an opening 34b for the exit of this chain 19.

Furthermore, bearing plate 31 comprises a recess 37 for positioning rail 11 on both its opposite sides. Bearing plate 31 also comprises at least two hydraulic flange clamps 40, of a known type, each of which are designed to enter a vertical hole 4 in tube plate 5. Preferably, and as shown in FIG. 5, bearing plate 31 has four hydraulic flange clamps 40 each located at one corner of this bearing plate 31. These flange clamps 40 each comprise a pin which is radially expandable in such a way as to immobilise the corresponding clamp within a vertical hole 4 in order to hold base 30 and the robot arm below tube plate 5 within water chamber 7.

So that robot arm 20 can be more easily inserted into water chamber 7 the device comprises an assembly 50 (FIGS. 1 and 4) for supporting and introducing this robot arm 20. This assembly 50 is movable and is provided with members 51 for attachment to the outer periphery of inspection opening 9 and comprises a plate 52 supporting robot arm 20 with its base 30 opposite inspection opening 9. This carriage 52 can be moved on assembly 50.

The repair of one or more connecting areas between partition plate 8 and tube plate 5 of water chamber 7 is carried out as follows.

First of all the connecting area which has to be repaired, in which cracks or incipient cracks are present, is identified by appropriate known means.

Then an operator located in this water chamber 7 receives through inspection opening 9 a first rail 11 on which a carriage 15 is placed. The operator locks flange clamps 18. He then performs the same operation with second rail 11 so that rails 11 form a continuous rolling track. Rail 11 carries a carriage 15 from which a chain 19 hangs within water chamber 7.

Figure 4:
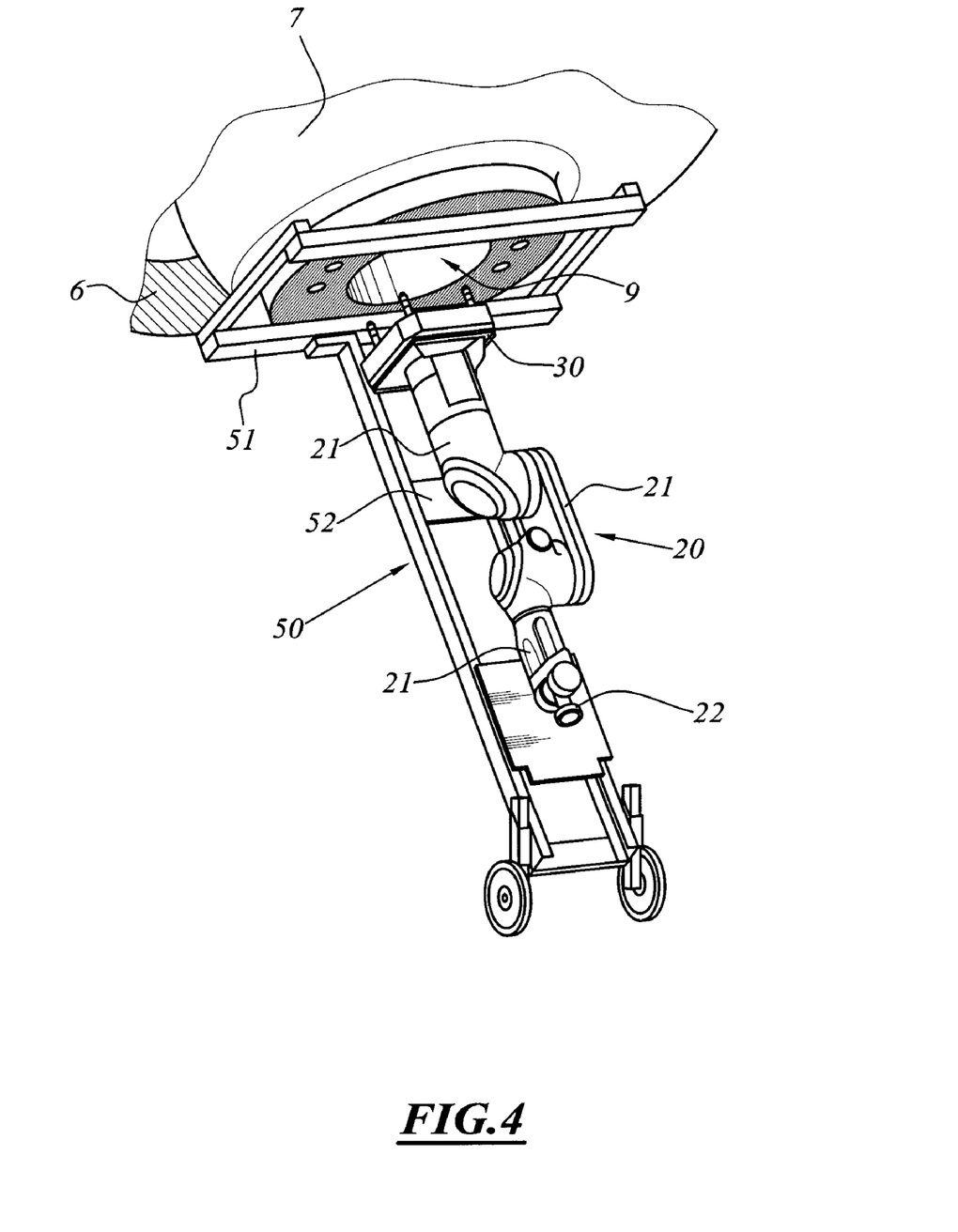
FIG. 4 is a diagrammatical perspective view of an assembly for the introduction of a robot arm.

The operator then clamps assembly 50 onto the outer edge of inspection opening 9 through fixing attachments 51 as shown in FIG. 4. Carriage 52 on assembly 50 supports robot arm 20, the attachment base 30 of this robot arm being placed opposite inspection opening 9.

The operator inserts a free end of a chain 19 into opening 34a of drawing means 33 located in base 30 of robot arm 20 and engages this chain 19 with the toothed wheel of this drawing means 33. The end of the chain leaves through outlet opening 34b. The toothed wheel of drawing means 33 is driven by motor/gearbox 36.

Carriage 52 moves on assembly 50 through a winch, not shown, to insert robot arm 20 within water chamber 7 as far as its first joint.

Robot arm 20 is hoisted by chain 19 and toothed wheel of drawing means 33 until the supports of plate 31 on attachment base 30 are in contact with the underside of tube plate 5. Flange clamps 40 are each positioned in a vertical hole 4 in this tube plate 5. As soon as attachment base 30 abuts against the underside of tube plate 5, robot arm 20 is locked onto said tube plate 5 using hydraulic flange clamps 40.

As robot arm 20 is equipped with a machining tool, such as for example a mill, a grinder or a jet of abrasive water, an operator remotely controls robot arm 20 from the outside of water chamber 7. The profile and flatness of the connecting area is detected by means of robot arm 20 which is remotely controlled by the operator from the outside of water chamber 7. This detection, performed for example by means of a sensor, makes it possible to create a reference before any machining takes place. Robot arm 20 adopts a reference associated with its position in water chamber 7 and machines the connecting area requiring repair to a particular depth to eliminate the cracks or incipient cracks in that area using a tool which it carries.

The operator then checks that there are no indications of cracks or incipient cracks within the connecting area so repaired and robot arm 20 equipped with an appropriate system of the known type if necessary fills by welding using a welding torch carried on the robot arm if the results of the inspection require it, or hammering of the machined surface to place the repaired area under compression.

These operations can therefore be performed without the need for operators being present within the steam generator's water chamber.

In fact insertion, positioning and attachment of the robot arm within the water chamber can be carried out wholly from outside the water chamber.

The invention claimed is:

1. A process for repairing at least one connecting area between a partition plate and a tube plate of a water chamber of a heat exchanger, the said water chamber comprising a wall of substantially hemispherical shape provided with at least one inspection opening and bounded at the top by the tube plate through which a plurality of vertical holes pass, and transversely by the partition plate, wherein:

the connecting area requiring repair is identified, at least one rail supporting at least one carriage which can move along the said rail and which is equipped with pendular lifting means is inserted into the water chamber through the inspection opening, the said rail is secured below the tube plate, a robot arm is passed in through the inspection opening, the robot arm is hoisted within the water chamber by the lifting means and the said robot arm is secured below the tube plate, the robot arm is remotely controlled, a reference associated with the position of the robot arm in the water chamber is obtained and the connecting area requiring repair is machined to a predetermined depth using a tool to eliminate cracks or incipient cracks in the said area, and elimination of these cracks or incipient cracks is checked.

2. A process according to claim 1, wherein after elimination of the cracks or incipient cracks has been checked, filling of the machined area by welding is carried out if appropriate by a welding torch carried by the robot arm.

3. A process according to claim 1, wherein after elimination of the cracks or incipient cracks has been checked or after the machined area has been filled by welding, hammering of the repaired area to place that area under compression is carried out by means of a tool carried by the robot arm.

4. A process according to claim 2, wherein after elimination of the cracks or incipient cracks has been checked or after the machined area has been filled by welding, hammering of the repaired area to place that area under compression is carried out by means of a tool carried by the robot arm.

* * * * *